United States Patent [19]

Mensch

[11] Patent Number: 5,620,084
[45] Date of Patent: Apr. 15, 1997

[54] CHAIN PROPELLED BELT CONVEYOR

[75] Inventor: William A. Mensch, Farmington, Mich.

[73] Assignee: Jervis B. Webb Company, Farmington Hills, Mich.

[21] Appl. No.: 413,597

[22] Filed: Mar. 30, 1995

[51] Int. Cl.⁶ .................................................. B65G 23/06
[52] U.S. Cl. ............................ 198/834; 198/838; 198/845
[58] Field of Search ....................................... 198/823, 834, 198/835, 838, 840, 842, 845, 849

[56] References Cited

U.S. PATENT DOCUMENTS

| | | |
|---|---|---|
| 2,808,146 | 10/1957 | Leach . |
| 3,052,341 | 9/1962 | Sheehan . |
| 3,107,778 | 10/1963 | Jordan . |
| 3,155,227 | 11/1964 | Wesson . |
| 3,556,286 | 1/1971 | Naito et al. . |
| 3,651,924 | 3/1972 | Homeier et al. ............... 198/845 X |
| 3,877,567 | 4/1975 | Sommerfield ................... 198/845 X |
| 3,934,708 | 1/1976 | Kambara . |
| 4,422,544 | 12/1983 | Alldredge ........................ 198/838 |
| 4,433,777 | 2/1984 | Densmore ....................... 198/834 |
| 4,438,842 | 3/1984 | Alldredge et al. ............... 198/845 X |
| 4,645,070 | 2/1987 | Homeier .......................... 198/845 X |
| 4,932,516 | 6/1990 | Anderson . |
| 5,083,655 | 1/1992 | Becker . |

FOREIGN PATENT DOCUMENTS

| | | | |
|---|---|---|---|
| R14237 | 12/1956 | Germany ........................ 198/845 |
| 1042461 | 10/1958 | Germany ........................ 198/845 |

OTHER PUBLICATIONS

Rex Engineered Chain catalog, p. C–10 (no date).

*Primary Examiner*—D. Glenn Dayoan
*Attorney, Agent, or Firm*—Gifford, Krass, Groh, Sprinkle, Patmore, Anderson & Citkowski, P.C.

[57] ABSTRACT

A chain propelled belt conveyor having a centrally mounted single strand of roller chain. The roller chain drives the belt and supports the belt along the upper load carrying run of the belt. Pairs of conveyor trolleys support the central portion of the belt about the return non-load carrying run of the belt. A track having a horizontal rail extending between a pair of opposed C-shaped channel sections is used to guide the roller chain assembly.

14 Claims, 3 Drawing Sheets

CHAIN PROPELLED BELT CONVEYOR

BACKGROUND OF THE INVENTION

I. Field of the Invention

The present invention is directed to a chain propelled belt conveyor having a centrally mounted drive and guidance assembly and, more particularly, to a drive and guidance assembly for a belt conveyor having a single roller chain.

II. Description of the Relevant Art

Chain driven belt conveyors for transporting materials are well known. These conveyors typically utilize a pair of motor driven sprockets to propel a pair of chains affixed to an endless belt. The pair of chains are connected to an underside of the belt. Each chain slides in a track which is formed to guide the chains between the sprockets. However, the sliding of the chains in the tracks causes significant wear on the chains and also results in a significant power loss to the conveyor system. A further disadvantage of this type of conveyor system is that the chains frequently exert unequal pull on the opposite sides of the belt.

Also known are chain driven belt conveyor systems utilizing a series of pivotably interconnected load carrying sections. Each section is supported for movement along the conveyor by a truck. The trucks are interconnected by a single chain. Each truck has a pair of end flanges extending from a transverse base. One of a pair of wheels is mounted to each flange to rotate about a vertical axis. The pair of wheels travel in a track section to guide the truck along both the upper run and lower run of the conveyor system. A vertically aligned shaft extends from the base between the flanges of the truck In support a central roller. The central roller is mounted to rotate about a vertical axis in a U-shaped guide rail of the track. However, such a conveyor system requires a large and complicated truck, as well as a special track. Accordingly, such a system is expensive to produce.

Traditional known troughed belt conveyors are known for holding certain materials, such as particulate matter. However, troughed belt conveyors require a large radius of curvature between the upper run and lower run. Accordingly, only chain conveyors or a flat belt with accordion-profile vertical edge are used in confined spaces. However, dual chain conveyors require clearance between the conveying bed and side wall or skirt enclosures.

SUMMARY OF THE INVENTION

The present invention is directed to a chain propelled belt conveyor having a belt propelled by a guide and drive assembly along a track. The drive assembly is guided on a plurality of rollers of a conventional roller chain during an upper run of the belt and a pair of trolley wheels during a lower run of the belt. The roller chain is a conventional type in which the rollers are linked by pairs of overlapping side bars. Each side bar has a flange which is mounted to an underside of the belt. A pair of trolley wheels are mounted on brackets extending from the flanges of alternate pairs of side bars.

The track includes a horizontally aligned center rail extending between two opposed C-shaped channel sections. Each channel section has an upright portion extending between a pair of end flanges. The channel sections open outwardly with the center rail. The rollers ride on the center rail during travel along the upper run of the belt. The trolley wheels ride on flanges of channel sections to guide the belt during the lower non-load carrying run of the belt. The outer edges of the belt are supported on a pair of sloped surfaces to form a trough.

The use of a single chain to drive the belt eliminates alignment and power loss problems of the dual chain arrangement of previously known chain propelled belt conveyors. Additionally, the use of a drive assembly with a conventional roller chain results in a conveyor system which is less expensive to produce than previously known conveyor systems.

Because the belt does not provide the drive force, there is no differential tension/compression across the belt. Accordingly, there is no belt buckling, and the belt will not lose its planned profile. Additionally, the conveyor requires no clearance at the edges. The belt can be formed into the trough with wide angled outer edges to provide a positive seal on the sloped surfaces.

Other advantages and features of the present invention will become more apparent from the following detailed description when read in conjunction with the accompanying drawing.

BRIEF DESCRIPTION OF THE DRAWINGS

The present invention will be more fully understood by reference to the following detailed description of the preferred embodiment of the present invention when read in conjunction with the accompanying drawing, in which like reference characters refer to like parts throughout the views, and in which.

DETAILED DESCRIPTION OF THE PREFERRED EMBODIMENT

Figure 1:
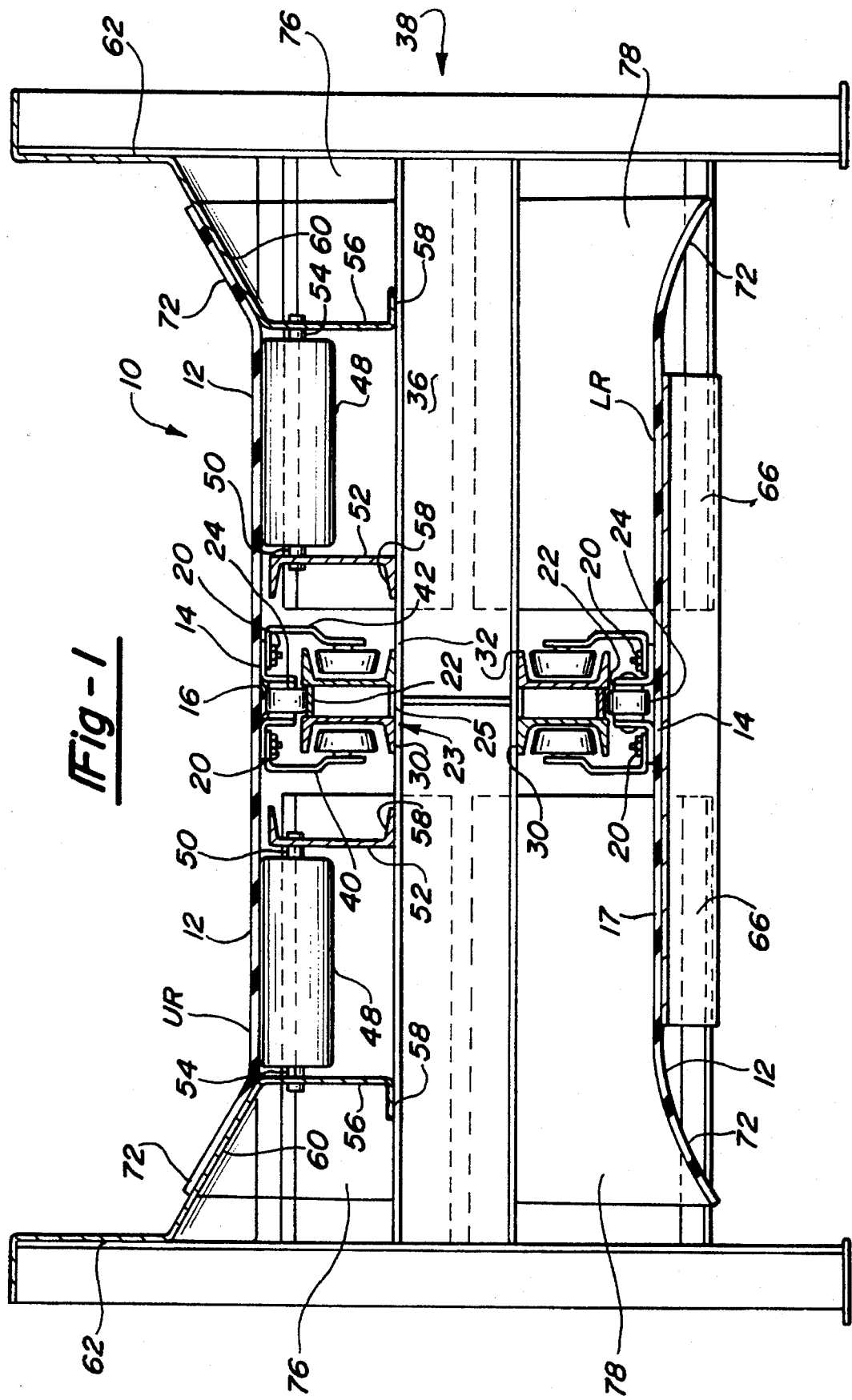
FIG. 1 is a cross-sectional view of a chain propelled belt conveyor in accordance with the present invention.

With reference first to FIG. 1, a chain propelled belt conveyor 10 of the present invention is thereshown and includes a continuous endless belt 12 having a single strand roller chain drive assembly 14 bolted to a center portion 16 between outer portions 17 of the belt 12. As is discussed more fully below, and shown in FIG. 2, the roller chain assembly 14 and belt are guided and supported by a track assembly 23 during an upper load bearing run UR and a lower non-load bearing run LR of the belt 12.

Figure 3:
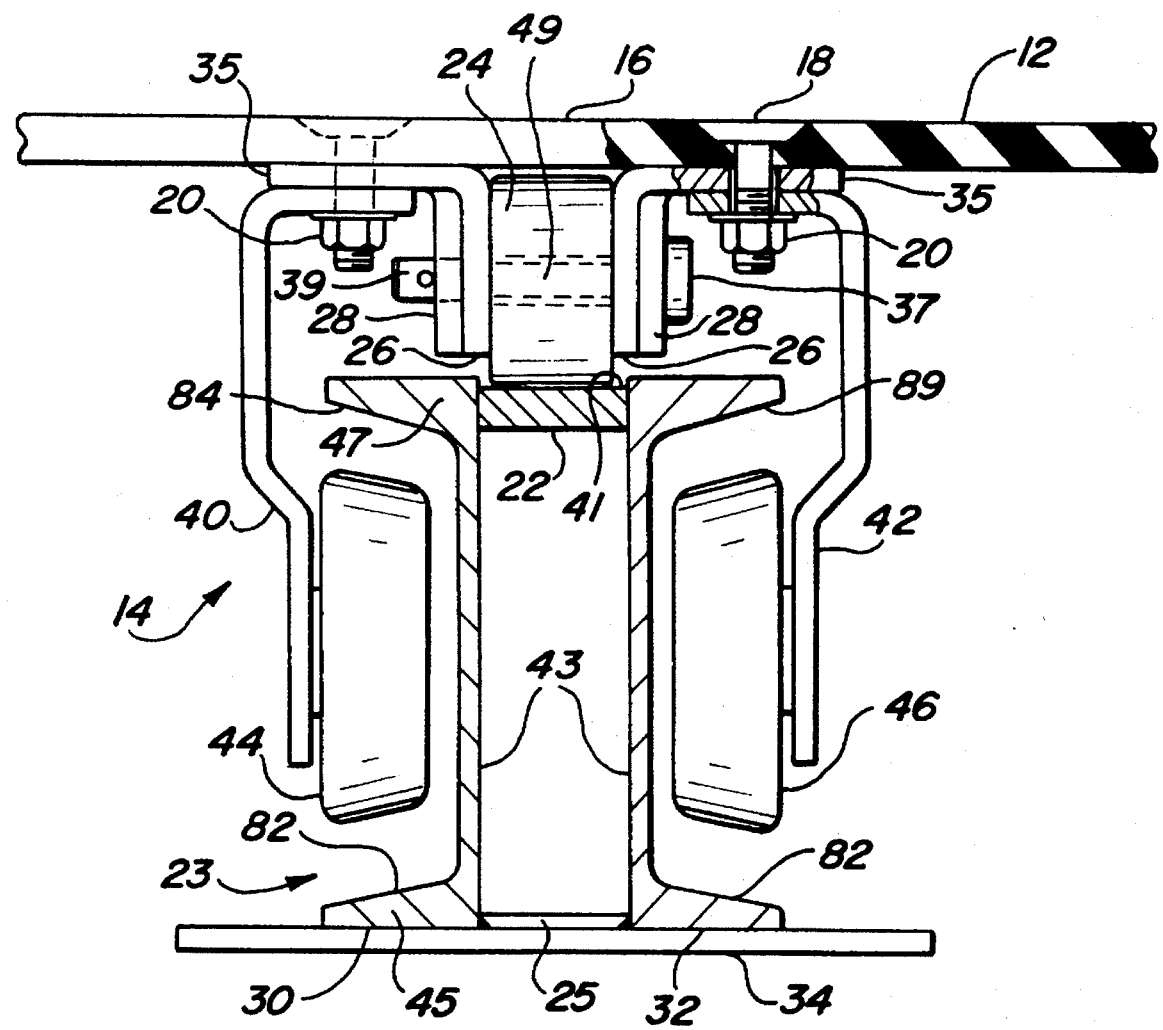
FIG. 3 is an enlarged cross-sectional view showing the chain propelled belt conveyor traveling along the upper load carrying run of the conveyor.

As shown in FIG. 3, the track assembly 23 includes a pair of opposed C-shaped channel sections 30, 32 mounted to a plate 34. Each channel section 30, 32 includes an upright portion 43 which extends between a lower flange 45 and an upper flange 47. A center rail 22 extends horizontally between the upright portions 43. The rail 22 is spaced downwardly from the upper flanges 47 of the channel sections 30, 32 to form a trough 41 to guide the chain assembly 14. As known in the art, the rail is formed of a suitably wear-hardened material. A spacer plate 25 is mounted between the lower flanges 45 of the channel sections. The rail 22 and spacer plate 25 are mounted by commonly known means such as hot soldering or brazing. The plate 34 is mounted by fasteners, such as bolts (not shown), to a horizontally extending C-channel 36 of a belt conveyor frame 38.

Figure 4:
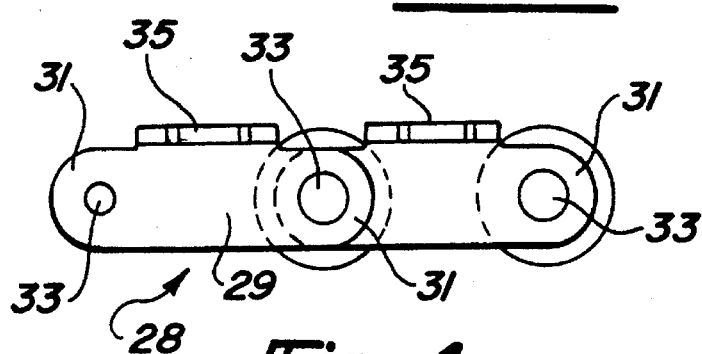
FIG. 4 is a side view of an inner side bar interconnected to an outer side bar of a roller chain.

As shown in FIGS. 3 and 4, the drive assembly 14 includes alternating pairs of inner side bars 26 and outer side bars 28 which link a plurality of center rollers 24 together. Each side bar 26, 28 has a center portion 29 extending between a pair of ends 31. Each end 31 has a bore 33 formed to accept a clevis pin 37. A flange 35 extends outwardly from the center portion 39 for mounting to the belt 12 by bolts 18 and nuts 20. The rollers 24 are linked by inserting the clevis pin 37 through the bores 33 of a pair of the inner side bars 26, and a pair of outer side bars 28, and one roller 24, as shown in FIG. 3. A cotter key or split ring (not shown) is inserted through a bore 39 in the pin to maintain the clevis pin 37 in position. Each center roller 24 rotates about the pin 37 on a bearing 49. Suitable roller assemblies of this type are commercially available from chain suppliers such as Rexnord.

As shown in FIG. 1, the drive assembly includes a pair of trolley brackets 40, 42 and trolley wheels 44, 46 to guide and support the belt 14 during the lower run LR.

As shown in FIG. 3, the trolley brackets 40, 42 are bolted to the flanges 35 of the inner side bars 26. The trolley wheels 44, 46 are mounted to the brackets 40, 42 for rotation about a horizontal axis. The trolley wheels 44, 46 ride freely in the channel sections 30, 32 during the upper load carrying run UR of the chain propelled belt conveyor 10. However, as shown in FIG. 1, the trolley wheels 44, 46 support the belt 12 on inner surfaces 82 of the lower flanges 45 during the lower run LR of the belt.

As shown in FIG. 1, two idler rollers 48 are provided on alternate sides of the roller chain assembly 14 to support the belt 12 along the upper load carrying run UR. Each idler roller 48 has an interior end 50 and an exterior end 54. The interior end 50 is supported by a C-shaped channel 52, and the exterior end 54 is supported by a lower end 58 of a slider plate 56. Both the C-channels 52 and lower ends 58 of the slider plates 56 are attached to the horizontal C-channel 36 of the frame 38 in a suitable manner, such as hot soldering or brazing. The slider plates 56 have a sloped surface 60 extending between the lower end 58 and upper end 62. The sloped surface 60 supports outer edges 72 of the conveyor belt 12, and directs items toward the center of the belt 12 on the upper load carrying run UR. Because the chain roller is mounted centrally the sloped surface 58 can extend a long distance under the outer edges 72 of the belt to provide an extensive overlap to form a positive seal. The distance of the overlap is important to assure that the edge 72 will seal with the slider plate 56. Belts with high modules, those that become stiff with a decrease in ambient temperature, require a long overlap to assure that the edge of the belt 12 will bear down on the plate 56.

The belt 12 is supported on the lower non-load carrying run LR by a pair of rollers. The rollers 66 are mounted in a horizontal alignment along the lower non-load carrying run LR by vertically extending structural tees (not shown). As is known in the art, cleats may also be used to support the belt 12 in place of rollers 66 along the lower non-load carrying run LR.

Figure 2:
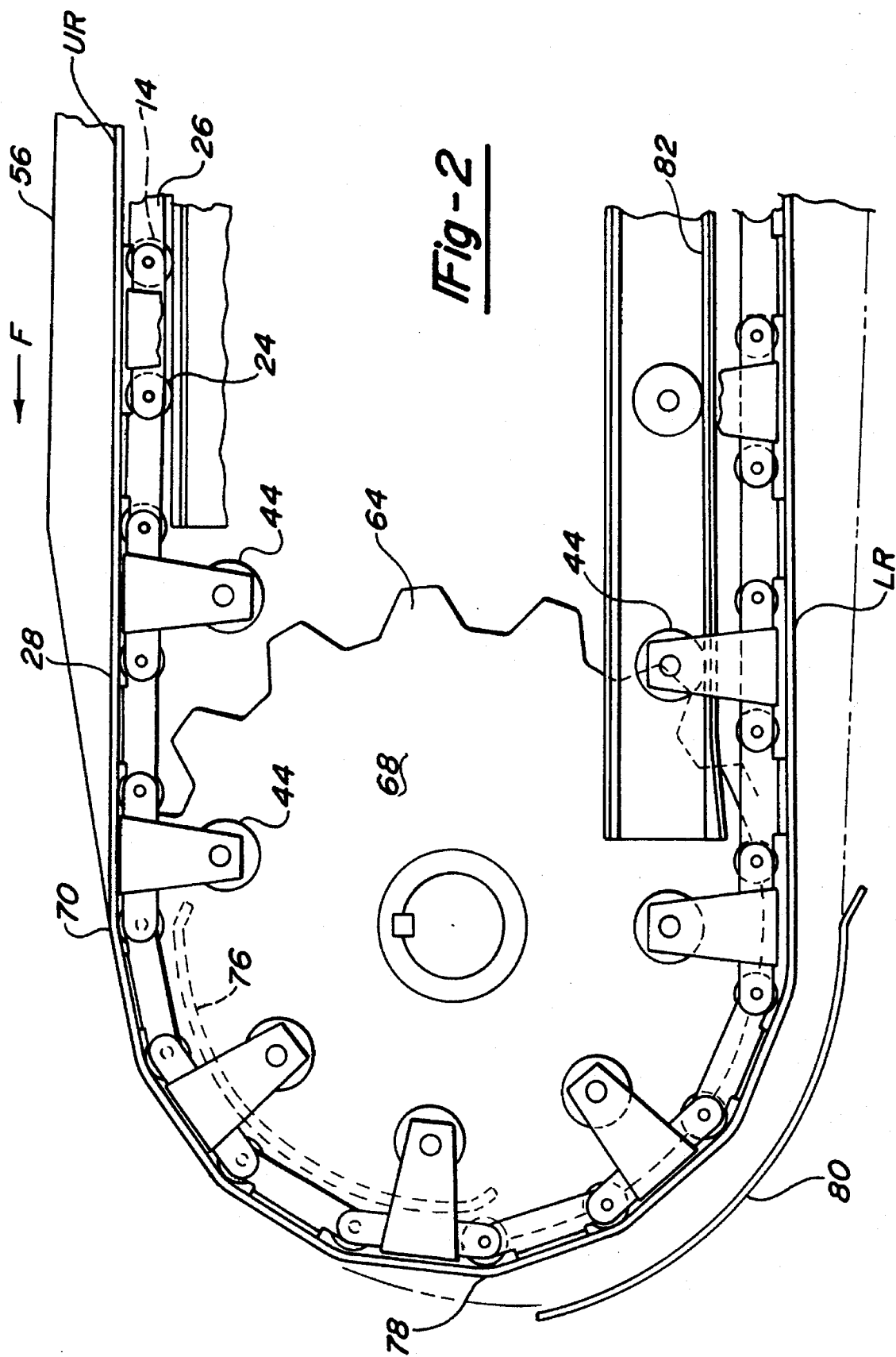
FIG. 2 is a side elevational view showing the belt conveyor passing around a sprocket an additional sprocket being provided at an opposite end of the belt conveyor as a mirror image at the initial sprocket and not shown for ease of illustration.

With reference now to FIGS. 1, 2 and 3, the belt 12 is propelled by the drive assembly 14 which is driven by an end sprocket 68. The sprocket 68 is rotatably driven by a motor (not shown). The sprocket 68 has a plurality of teeth 64 which mesh with the rollers 24 to propel the chain assembly 14. In FIG. 2 the belt 12 is shown travelling in a counterclockwise direction designated as F. The slider plates 56 discontinue at a point 70 where the drive assembly 14 and the belt 12 meet with the end sprocket 68. The outer edges 72 of the belt 12 are no longer supported by the slider plates 56 at this point. A guard 76 is provided on the outer sides of the end sprocket wheels 68 to support the outer edges 72 of the belt 12 as the belt 12 travels around the upper half of the end sprocket wheel 68

When the belt 12 approaches a midpoint 78 of the end sprocket wheels 68, gravity forces the belt 12 to fall downwardly away from the drive assembly 14. A pair of second guards 80 are therefore spaced apart from the end sprocket 68 to support the edges 72 of the belt 12 during transition from the upper load carrying run UR to the lower non-load carrying run LR. For conveyor systems handling fine material, stub shaft cantilevered rollers may be used instead of the second guards to support the edges of the belt 12. "fine" material such as particulate matter occasionally adheres to the belt and could wedge between the guards 80 and belt. The use of rollers overcomes such a problem.

During the transition of the belt 12 from the upper load carrying run UR to the lower non-load carrying run LR, the roller 24 disengages from the rail 22. The trolley wheels 44, 46 engage the inner surfaces 82 of the lower ends of the channel sections 30, 32.

At the opposite end of the belt conveyor 10, a sprocket (not shown) similar to end sprocket 68 is also provided to guide the belt 12 through an upward vertical curve in the conveyor 10. An identical arrangement of the guards 76, 80 is provided to support the outer edges 72 of the belt 12 as it travels about the sprocket. As the belt 12 travels along the upward vertical curve, the trolley wheels 44, 46 engage the upper flanges 86 of the channel section 30, 32, to guide the belt 12 through the curve. In this way, the driving force for the chain propelled belt conveyor 10 is the drive assembly 14. The belt 12 acts only as the conveying medium.

Having described my invention, however, many modifications thereto will become apparent to those skilled in the art to which it pertains without deviation from the spirit of the invention as defined by the scope of the appended claims. For instance, separate tracks could be fabricated for the upper run and lower run. The center rail 22 is not necessary for the lower run.

I claim:

1. A belt conveyor comprising:

a frame:

a conveyor belt;

a drive assembly having a chain and a pair of trolley wheels, said chain centrally mounted to an underside of said belt, said chain further having a plurality of spaced apart rollers mounted for rotation about a horizontal axis;

a track having a rail for supporting said plurality of rollers of said chain and said belt during an upper run of said belt;

means for supporting said trolley wheels and said belt along a lower run of said belt; and means for driving said chain to propel said conveyor belt.

2. The invention defined in claim 1, wherein said means for driving further comprises a pair of spaced apart sprocket wheels, said sprocket wheels carrying said chain and said belt between said upper run and said lower run; and means for supporting an outer portion of said belt during travel about each of said pair of sprockets.

3. The invention as claimed in claim 1, wherein said chain comprises a pair of inner side bars connected to a pair of outer side bars.

4. The invention as claimed in claim 3, wherein said drive assembly further comprises a bracket for supporting each of said pair of trolley wheels.

5. The invention as defined in claim 1, wherein said belt conveyor further comprises a slider plate fixedly attached to said frame for supporting said belt along said upper load carrying run.

6. The invention as defined in claim 1 and further comprising means for supporting an outer portion of said belt along said lower non-load carrying run.

7. The invention as defined in claim 6, said support means further comprising at least one roller mounted to said frame.

8. The invention as defined in claim 1, wherein said rail extends between a pair of upright portions forming a trough to guide said rollers.

9. A belt conveyor comprising:

a conveyor belt;

a single strand of roller chain centrally mounted to said belt, said roller chain having a plurality of central rollers for carrying said belt along the upper load carrying run of said belt;

means for guiding said belt along a lower run of said belt, wherein said means for guiding further comprises a trolley wheel assembly fixedly mounted to said roller chain: said trolley wheel assembly having a pair of trolley wheels mounted on alternate sides of said roller chain; and means for driving said roller chain to propel said conveyor belt, said means for driving having a pair of spaced apart sprocket wheels carrying said chain and said belt between said upper run and said lower run; and means for supporting an outer portion of said belt during travel about each of said pair of sprockets.

10. The invention as claimed in claim 9, wherein said chain comprises a pair of inner side bars connected to a pair of outer side bars.

11. The invention as claimed in claim 10, wherein said means for guiding further comprises a bracket for supporting each of said pair of trolley wheels.

12. The invention as defined in claim 6, further comprising a track having a horizontally aligned rail for supporting said plurality of rollers along said upper run.

13. A belt conveyor comprising:

a conveyor belt;

a single strand of roller chain centrally mounted to said belt, said roller chain having a plurality of central rollers for carrying said belt along the upper load carrying run of said belt;

means for guiding said belt along a lower run of said belt, wherein said means for guiding further comprises a trolley wheel assembly fixedly mounted to said roller chain; said trolley wheel assembly having a pair of trolley wheels mounted on alternate sides of said roller chain;

means for driving said roller chain to propel said conveyor belt; and a slider plate fixedly attached to said frame for supporting said belt along said upper load carrying run.

14. A belt conveyor comprising:

a conveyor belt;

a single strand of roller chain centrally mounted to said belt, said roller chain having a plurality of central rollers for carrying said belt along the upper load carrying run of said belt;

means for guiding said belt along a lower run of said belt, wherein said means for guiding further comprises a trolley wheel assembly fixedly mounted to said roller chain; said trolley wheel assembly having a pair of trolley wheels mounted on alternate sides of said roller chain;

means for driving said roller chain to propel said conveyor belt; and means for supporting an outer portion of said belt along said lower non-load carrying run having at least one roller mounted to said frame.

* * * * *